(12) United States Patent
Gouzonnat et al.

(10) Patent No.: US 8,985,083 B2
(45) Date of Patent: Mar. 24, 2015

(54) CRANKSHAFT HAVING OPTIMIZED CRANKPIN LUBRICATION, AND RELATED ENGINE AND METHOD FOR PRODUCING THE LUBRICATION SYSTEM

(75) Inventors: Fabien Gouzonnat, Sevres (FR); Carlos Pai Joao, Paris (FR)

(73) Assignees: Peugeot Citroen Automobiles SA (FR); GM Global Technology Operations LLC, Detroit, MI (US)

( * ) Notice: Subject to any disclaimer, the term of this patent is extended or adjusted under 35 U.S.C. 154(b) by 61 days.

(21) Appl. No.: 14/000,243

(22) PCT Filed: Jan. 18, 2012

(86) PCT No.: PCT/FR2012/050104
§ 371 (c)(1),
(2), (4) Date: Aug. 19, 2013

(87) PCT Pub. No.: WO2012/114005
PCT Pub. Date: Aug. 30, 2012

(65) Prior Publication Data
US 2013/0327290 A1    Dec. 12, 2013

(30) Foreign Application Priority Data
Feb. 21, 2011    (FR) .................................. 11 51395

(51) Int. Cl.
*F01M 1/02*    (2006.01)
*F16C 3/14*    (2006.01)

(52) U.S. Cl.
CPC ...................................... *F16C 3/14* (2013.01)
USPC ...................................... 123/196 R; 184/6.5

(58) Field of Classification Search
USPC ............. 123/196 R, 197.4; 184/6.5; 384/288; 74/595
See application file for complete search history.

(56) References Cited

U.S. PATENT DOCUMENTS

| | | | | |
|---|---|---|---|---|
| 2,723,003 | A | * 11/1955 | Antonsen | ........................ 184/6.5 |
| 2,955,675 | A | 10/1960 | Leach | |
| 3,763,341 | A | * 10/1973 | Willis | ............................ 200/468 |
| 5,138,991 | A | * 8/1992 | Wojdyla | .................... 123/196 R |
| 5,152,373 | A | 10/1992 | Callies | |
| 5,794,581 | A | 8/1998 | Wedel, Jr. et al. | |
| 7,350,498 | B2 | * 4/2008 | Matsuda | ................... 123/196 R |

FOREIGN PATENT DOCUMENTS

JP    2006009620 A    1/2006

OTHER PUBLICATIONS

International Search Report for corresponding application PCT/FR2012/050104 dated Mar. 28, 2012.

* cited by examiner

*Primary Examiner* — Hung Q Nguyen
(74) *Attorney, Agent, or Firm* — Polster Lieder

(57) ABSTRACT

The invention relates to a crankshaft comprising at least: a journal; a first crankpin; a second crankpin; a first arm connecting the first crankpin to the journal; a second arm connecting the second crankpin to the journal; a first pipe extending away from the first crank pin toward the journal and leading onto the surface of the first crankpin on the transverse median plane thereof, and substantially passing to the center of the median plane of the second arm; and a second conduit extending away from the second crankpin toward the journal and leading onto the surface of the second crankpin on the transverse median plane thereof, and substantially passing to the center of the median plane of the second arm, characterized in that the shape of the crankshaft is such that it cannot also comprise a diametric pipe within the transverse median plane of the journal fluidly adjoining the first pipe and the second pipe, and the crankshaft comprises a third non-diametric pipe within the transverse median plan of the journal fluidly connecting the first pipe and the second pipe.

7 Claims, 3 Drawing Sheets

US 8,985,083 B2

Figure 1:
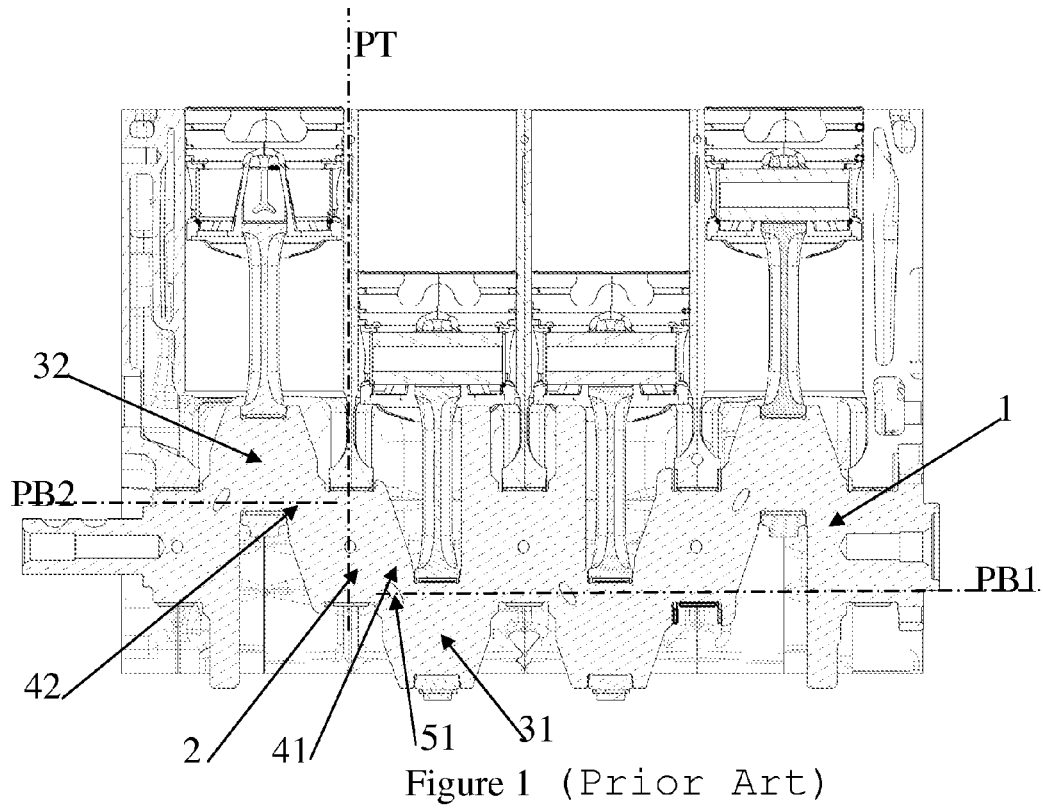

CRANKSHAFT HAVING OPTIMIZED CRANKPIN LUBRICATION, AND RELATED ENGINE AND METHOD FOR PRODUCING THE LUBRICATION SYSTEM

CROSS-REFERENCE TO RELATED APPLICATIONS

The present invention is the U.S. national stage under 35 U.S.C. §371 of International Application No. PCT/FR2012/050104, which was filed on Jan. 18, 2012 and which claims the priority of application FR 1151395 filed on Feb. 21, 2011 the content of which (text, drawings and claims) is incorporated here by reference in its entirety.

FIELD

The invention concerns the domain of internal-combustion-engine lubrication, and more particularly the lubrication of the moving linkage, that is, the assembly including the pistons, the connecting rods, and the crankshaft.

BACKGROUND

All internal-combustion engines containing pistons exhibit at least one crankshaft. The crankshaft constitutes the crank of a connecting rod/crank system, which allows the reciprocating motion of the piston to be transformed into the rotary motion of the engine flywheel.

In order to ensure the reliability of the link between the crankshaft at a crankpin and the corresponding connecting rod, it is necessary to lubricate this link. The lubrication consists of bringing oil under pressure into this link.

More precisely, the principal oil line of the engine feeds shaft-line/journal bearings disposed between the engine block and the crankshaft journals. These bearings include a groove in which the oil under pressure can be stored. A bore in the crankshaft going from a journal to a crankpin allows oil feed at the crankpin of the link between the crankshaft and the corresponding connecting rod. This type of architecture is known, for example, from U.S. Pat. No. 2,955,675.

The architecture of these feed lines must, in addition, meet certain imperative constraints. The bore for a journal to feed a crankpin should affect the mechanical resistance of this arm as little as possible. In order to do this, it must pass roughly to the center of the arm connecting the journal to the crankpin, which results, in particular, in a central passage at a median plane roughly equidistant from the journal axis and the crankpin. In addition, the outlet of the lubrication line at a crankpin must be executed outside zones of high stress to which the crankpin is subjected, or the oil film providing the lubrication would be disrupted and the lubrication would be less consistent in those zones where it is essential.

In order to improve the lubrication, it is known to execute a diametric bore in the journal. It involves a straight bore perpendicular to the axis of crankshaft rotation and intercepting the axis of rotation. Thus, this diametric bore is executed along a diameter of the plane of a transverse median section of the journal, orthogonally to the crankshaft axis of rotation. This diametric bore can in addition emerge at the same place as the bore between the journal and the crankpin. The diametric bore offers two inlets in the crankshaft for the oil under pressure and facilitates the circulation of the oil. The absence of such a bore can lead to discontinuous oil feed for the crankpins during an engine cycle, over about 180° of crankshaft rotation, because the oil cushion formed at the journal is generally only achievable in the upper part of the journal (cushion formed in the upper half-collar of the journal), and this is for reasons of wear and mechanical performance of the lower half-collar of the cushion.

It is in addition known, and implemented in some applications, to feed lubricating oil to two crankpins from a single journal. This greatly simplifies the lubricating system, facilitates its execution, and reduces the costs of implementation. The diametric bore then intercepts the two bores connecting the journal to the two crankpins it is feeding. The diametric bore specifically allows feed of the two crankpins to be obtained over 360° of crankshaft rotation.

Thus, the system for greasing or lubricating the crankshaft as known in prior art poses no particular problem for the majority of engines. However, this architecture, in which two crankpins are fed by one journal exhibiting a diametric bore, is no longer applicable in certain cases, particularly, for example, under certain conditions of angular shift between the two crankpins being fed and which are associated with small crankpin or journal diameters and a greater crank radius. The situation can occur more commonly, for instance, in the case of a three-cylinder engine.

In these cases, no geometric construction can guarantee, simultaneously:
  a position of oil feed lines at the crankpins that is compatible with correct oil feed outside zones of high crankpin stress.
  passage of the bore into a zone of the crankshaft arms that does not significantly weaken the crankshaft, specifically passing roughly to the center of the arm connecting the crankpin and the journal.
  a diametric bore of the journal joining the two bores coming from the crankpins.

Within the scope of engines exhibiting small-diameter crankpins and/or journals with an unfavorable angular offset of two crankpins, it is therefore necessary, according to the architectures known in prior art, to modify the architecture of the lubrication system in the crankshaft either/or:
  by eliminating the diametric bore of the journal, but then the oil feed for the connecting rods is affected. Feed only occurs during part of the cycle and is therefore discontinuous. This drawback makes the absence of a diametric bore rare in the case in which two crankpins are fed from a single journal,
  by adopting an architecture in which each journal feeds a single crankpin, which presents drawbacks in terms of complexity and cost of execution, but also brings about an increase in leakage at the journals.

SUMMARY

The invention aims to propose a crankshaft exhibiting a system architecture for lubrication in the crankshaft that is adapted to engines exhibiting crankpin and/or journal diameters incompatible with the architecture in which two crankpins are fed by one journal exhibiting a diametric bore (or, more generally, an architecture incompatible with such a diametric bore) but exhibiting roughly the same advantages.

More precisely, the invention concerns a crankshaft including at least:
  one journal;
  a first crankpin;
  a second crankpin;
  a first arm connecting the first crankpin to the journal;
  a second arm connecting the second crankpin to the journal;
  a first straight conduit from the first crankpin to the journal, emerging at the surface of the first crankpin at its median transverse plane and passing roughly to the center of the median plane of the first arm;

a second straight conduit from the second crankpin to the journal, emerging at the surface of the second crankpin at its median transverse plane and passing roughly to the center of the median plane of the second arm;

in which, with the crankshaft exhibiting a geometry such that it cannot include in addition a diametric conduit in the median transverse plane of the journal fluidly joining the first conduit and second conduit, the crankshaft includes a third straight conduit, non-diametric, in the median transverse plane of the journal, which fluidly connects the first conduit and the second conduit.

The third conduit thus drilled allows feed over a range of crankshaft rotation greater than 180°, approaching the lubrication obtained with a diametric bore.

Preferably, the third conduit follows a non-diametric chord of the median transverse plane of the journal, the non-diametric chord emerging at the surface of the journal on both sides of a sector of the median transverse plane of the journal, exhibiting a sector angle from 90° up to, but not including, 180°.

The aim is to approach a sector angle of 180° (defined by a diametric bore), which is nevertheless excluded because the invention applies to a crankshaft for which such a diametric bore cannot be executed. At a sector angle of less than 90°, the third bore is more complex and is of less interest (lubrication of the crankpins over less than 270° of the crankshaft angle of rotation).

Preferably, in addition, the first and second conduits emerge at the surface of the journal at its median transverse plane. Conduits emerging at the journal surface are simpler to execute than conduits emerging in the non-diametric bore of the journal.

The invention likewise concerns an engine including such a crankshaft. Preferably, the invention concerns such an engine on whose crankshaft the zones of high stress are determined at the surface of the first and second crankpins, corresponding to journal zones upon which are exerted forces greater than a pre-defined threshold during engine operation, the first and second conduits emerging respectively at the surface of the first and second crankpins outside the high-stress zones. Taking the zones of high stress into account constitutes an additional constraint above and beyond the geometric characteristics alone of the crankshaft, which stand in the way of the joint presence of feed lines that do not weaken the crank arms and of drilling a diametric conduit in the journal.

The invention likewise concerns a method for executing a crankpin lubrication system for a crankshaft, allowing the execution of a crankshaft in accordance with the invention, the crankshaft including at least one journal, a first crankpin, and a second crankpin, a first arm connecting the first crankpin to the journal, and a second arm connecting the second crankpin to the journal, the crankshaft exhibiting a geometry such that it cannot simultaneously include:

a first straight conduit from the first crankpin to the journal and a second straight conduit from the second crankpin to the journal, the conduits emerging respectively at the surface of the first and second crankpins at their respective median transverse planes, passing respectively roughly to the center of the median plane of the first and second arms, a diametric bore in the median transverse plane of the journal fluidly joining the first conduit and second conduit;

characterized by the steps of:

drilling a first straight conduit from the first crankpin to the journal and a second straight conduit from the second crankpin to the journal, the conduits emerging respectively at the surface of the first and second crankpins, at their respective median transverse planes and passing respectively roughly to the center of the median plane of the first and second arms;

drilling a third straight conduit into the median transverse plane of the journal, connecting the first conduit and the second conduit.

Preferably, such a method is applied to the crankshaft of an internal-combustion engine in which the zones of high stress are determined at the surface of the first and second crankpins, corresponding to the crankpin zones upon which are exerted forces greater than a pre-defined threshold during engine operation, the first and second conduits emerging respectively at the surface of the first and second crankpins outside the high-stress zones.

DRAWINGS

The invention is described in more detail hereinafter, in reference to the figures schematically depicting known prior art as well as a crankshaft in accordance with specific embodiments of the invention.

FIG. 1 presents, in a sectional view, an internal-combustion engine including a crankshaft exhibiting an architecture known in prior art.

Figure 2A:
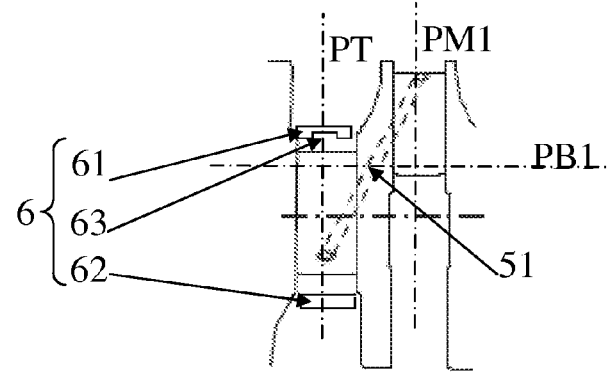

FIG. 2a schematically presents a journal and a crankpin for a crankshaft and the system for lubricating the crankpin according to a first embodiment known in prior art.

Figure 2B:
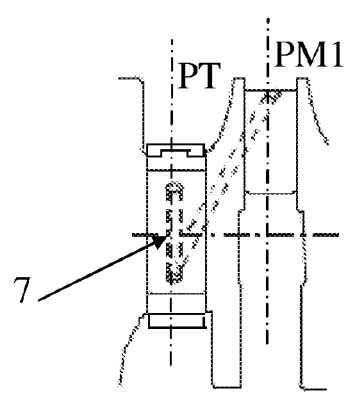

FIG. 2b schematically presents a journal and a crankpin for a crankshaft and the system for lubricating the crankpin according to a second embodiment known in prior art.

Figure 2C:
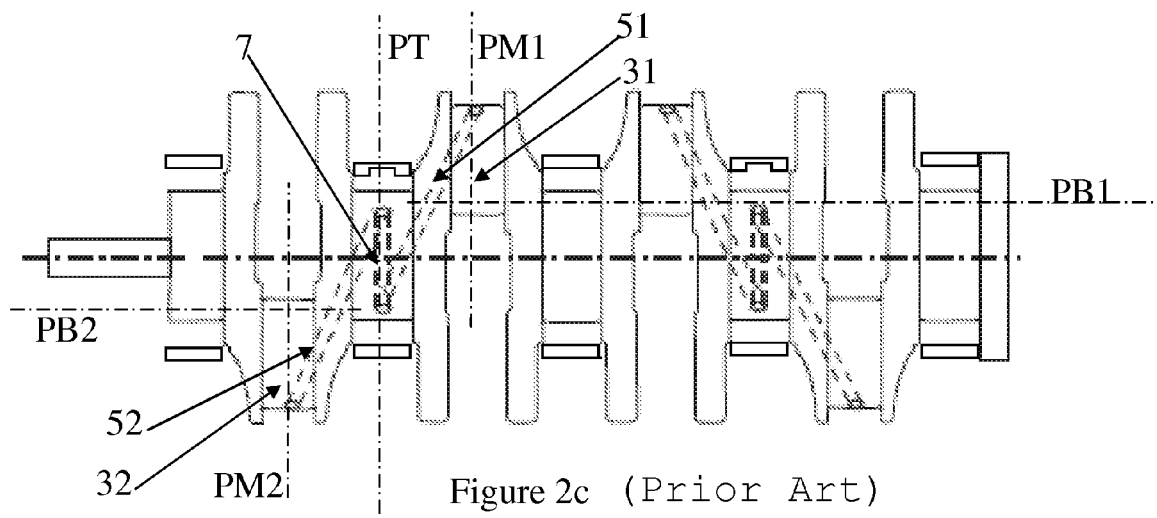

FIG. 2c schematically presents a crankshaft for a four-cylinder engine and the system for lubricating its crankpins according to a third embodiment known in prior art.

Figure 3:
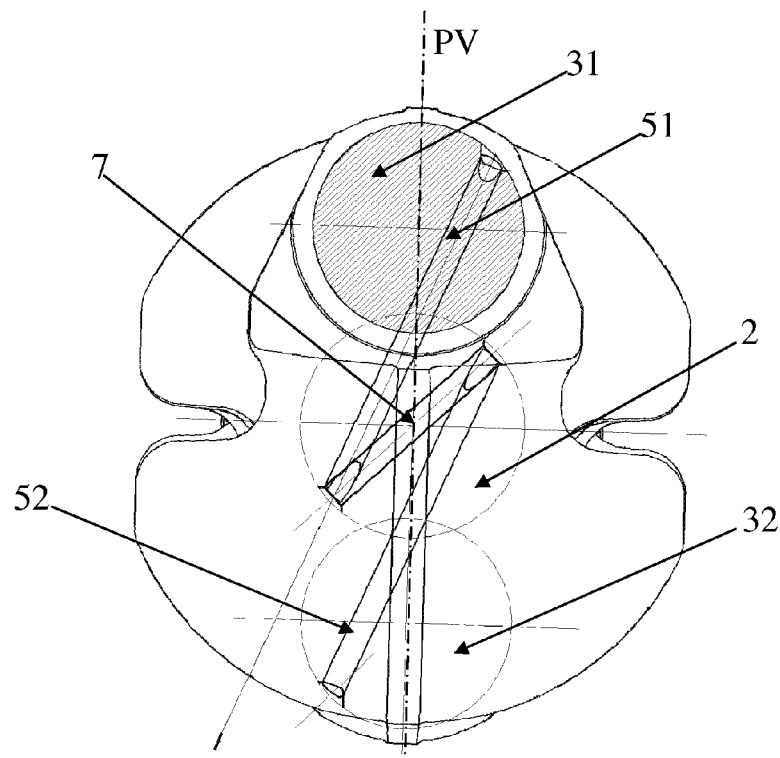

FIG. 3 presents a transverse schematic view of a journal and two crankpins for a crankshaft in accordance with that of FIG. 2c and the associated lubrication system.

Figure 4:
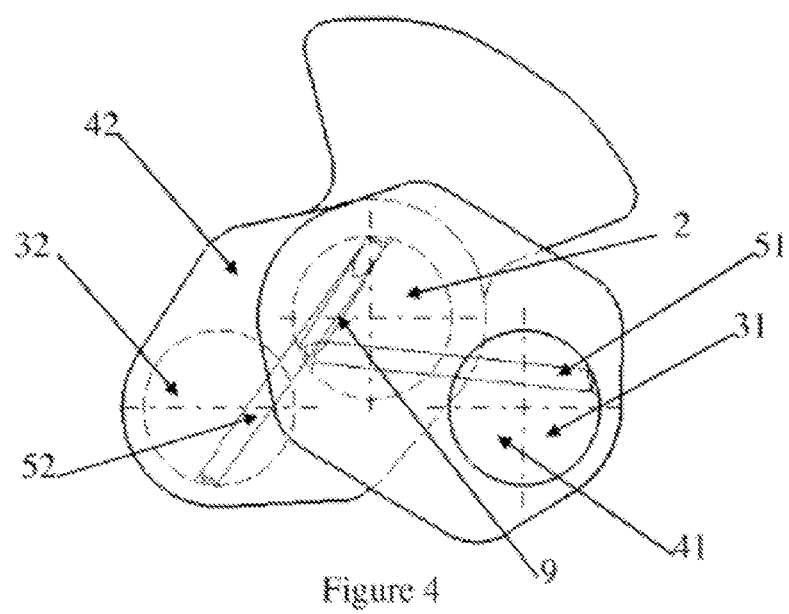

FIG. 4 presents a transverse schematic view of a crankshaft of a three-cylinder engine in accordance with various embodiments of the invention.

Figure 5:
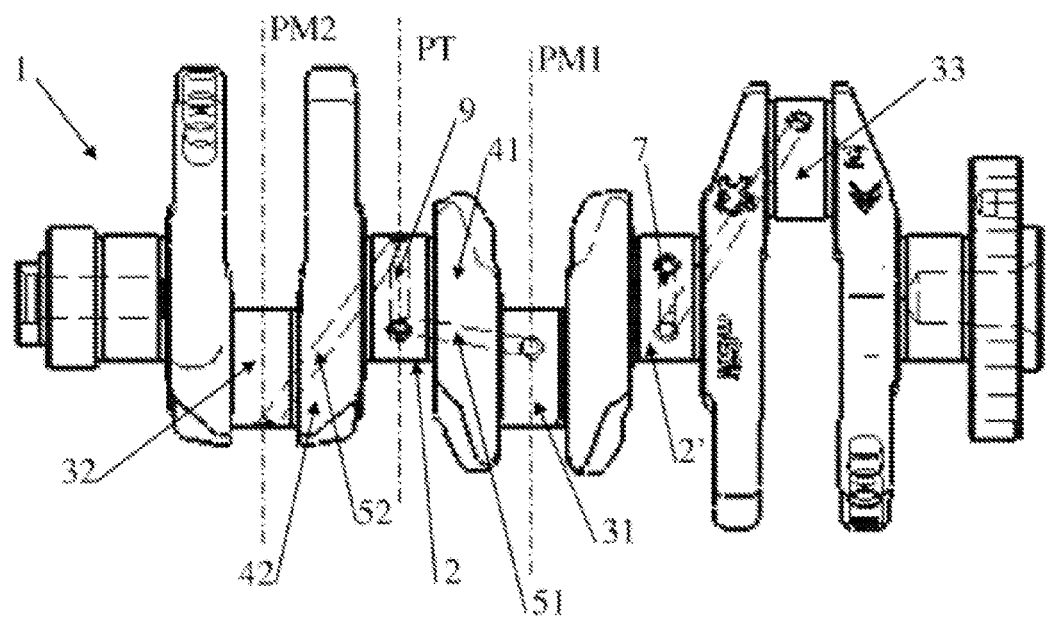

FIG. 5 presents a crankshaft for a three-cylinder engine in accordance with various embodiments of the invention.

DETAILED DESCRIPTION

In FIG. 1, an internal-combustion engine of the in-line, four-cylinder type is depicted, according to a longitudinal-section view of its crankshaft 1.

The crankshaft 1 exhibits a journal 2, on the two sides of which are positioned a first crankpin 31 and a second crankpin 32. A first arm 41 connects the journal 2 to the first crankpin 31. A second arm 42 connects the journal to the second crankpin 32.

A lubrication system allows lubricating oil to feed the crankpins 31 and 32 from the journals. Within the scope of the engine depicted here, each crankpin 31 and 32 is fed by a different journal. The first crankpin 31 is fed by journal 2.

In order to do this, a first straight conduit 51, passing roughly to the center of median plane PB1 of the first arm 41, is made between journal 2 and the first crankpin 31. The first conduit 51 emerges from one side at the surface of journal 2 at its median transverse plane PT, and from the other side at the surface of the first crankpin 31 at its median transverse plane.

FIG. 2a schematically presents a journal and a crankpin for a crankshaft and the system for lubricating the crankpin according to a first embodiment known in prior art, which corresponds to the embodiment of the crankshaft in FIG. 1.

In FIG. 2a is found the set of data and references presented in FIG. 1, as well as the detail representation of the shaft-line bearing 6, including an upper half-collar 61 and a lower half-collar 62. The upper half-collar 61 manages an oil reserve 63, which can penetrate into the first conduit 51 while the opening of said first conduit 51 is opposite the upper half-collar 61, that is, at about 180° of crankshaft rotation.

FIG. 2b schematically presents a journal and a crankpin for a crankshaft and the system for lubricating the crankpin according to a second embodiment known in prior art. According to this embodiment, a diametric journal bore 7 is executed, exiting the opening of the first bore 51. Thus, the lubrication system made up of the first bore and the diametric bore 7 is fed by the oil reserve 63 over 360° (or practically 360°) of crankshaft rotation. The continuous lubrication of the crankpin is thus ensured, which secures better reliability and less wear.

FIG. 2c schematically presents a crankshaft 1 for a four-cylinder engine and the system for lubricating its crankpins according to a third embodiment known in prior art. In this variant, besides the first conduit 51 feeding the first crankpin 31, a second conduit 52 feeds a second crankpin 32 from the same journal 2. The second conduit 52 meets the same requirements as the first conduit 51. It passes roughly to the center of the median plane PB2 of the second arm 42. The second conduit 52 emerges from one side at the surface of journal 2 at its median transverse plane PT, and from the other side at the surface of the second crankpin 32 at its median transverse plane. In known prior art, and as depicted in the variant described here, the second conduit 52 emerges at the surface of journal 2 at a point diametrically opposite the opening of the first conduit 51, so as to connect the opening of the first conduit 51 and that of the second conduit 52 by means of a diametric bore 7.

The diametric bore 7 therefore allows system feed (and therefore feed for the two crankpins) for 360° of the rotation of crankshaft 1.

FIG. 3 presents a schematic transverse view of a journal and two crankpins for a crankshaft, in accordance with that of FIG. 2c, and the associated lubrication system. The positioning of the conduits and the diametric bore 7 is shown in this figure. The opening of the first (or second) conduit 51 (or 52) at the crankpin is positioned in a low-load zone, that is, a zone where the crankpin is subjected to forces lower than a predefined threshold during engine operation, provided with engine 1. In contrast, the high-load zones, from which the openings of the first and second conduits are at some distance, correspond to zones subject to high forces during engine operation, such that the oil film providing lubrication in these zones must be particularly steady and must not be disrupted. It is therefore not possible to position the opening of the lubrication lines in these zones. These considerations explain the offset positioning of the opening in relation to the crankshaft plane of symmetry PV.

FIG. 4 presents a view of a crankshaft of a three-cylinder engine in accordance with various embodiments of the invention.

In the invention, a first straight conduit 51, passing roughly to the center of the median plane of the first arm 41, is made between journal 2 and the first crankpin 31. The first conduit 51 emerges at the surface of the first crankpin 31 at its median transverse plane.

A second straight conduit 52, passing roughly to the center of the median plane of the second arm 42, is made between journal 2 and the second crankpin 32. The second conduit 52 emerges at the surface of the second crankpin 32 at its median transverse plane.

In the invention, the first conduit 51 is fluidly connected to the second conduit 52 at the median transverse plane PT of the journal by means of a non-diametric bore forming a third conduit 9. The third conduit 9 is thus drilled along a non-diametric chord of the median transverse plane PT of the journal.

In various implementations, the non-diametric chord emerges at the surface of the journal on the two sides of a sector of the median transverse plane PT of the journal, exhibiting a sector angle from 90° up to, but not including, 180°. The value of 180° is of course excluded because it involves a diameter; and so the invention applies to a crankshaft that cannot exhibit such a diametric bore. An angle less than 90° is not totally excluded, but it becomes difficult technically to execute a bore between the openings of the first and second conduits, because that allows lubrication-system feed over less than 270° of the crankshaft rotation. In other words, the link between technical complexity and the beneficial effect obtained becomes less favorable.

FIG. 5 presents a crankshaft 1 for a three-cylinder engine in accordance with various embodiments of the invention. In this application, a first crankpin 31 and a second crankpin 32 are fed by only one journal 2 exhibiting a third non-diametric bore 9. The third crankpin 33 is fed by the other journal 2', which can display a diametric bore 7 for this, providing crankpin lubrication over 360° of crankshaft rotation.

The bore of the third straight, non-diametric conduit 9 can be obtained by the same drilling method as that used for drilling the first and second conduits 51 and 52. The third non-diametric conduit 9 is therefore offset relative to the center of the journal (center of the median circular plane PT of the journal).

This offers numerous advantages unknown in prior art. This offset in the bore relative to the center, which can exceed 1 mm (and can reach several mm) offers degrees of freedom for positioning the bores coming from the crankpins, while guaranteeing lubrication of the crankpins over an extended range of rotation for the crankshaft 1.

The degrees of freedom provided for positioning the bores coming from the crankpins allow an architecture to be retained for lubricating two crankpins by means of one journal, without taking the risk to lubrication that would be associated with the absence of a bore in the journal. The invention thus allows for practically combining the advantages of lubricating two crankpins by means of a single journal (specifically, an optimization of the permeability of the lubricating system) and of diametric drilling (quasi-continuous oil feed for the crankpins).

The description herein is merely exemplary in nature and, thus, variations that do not depart from the gist of that which is described are intended to be within the scope of the teachings. Such variations are not to be regarded as a departure from the spirit and scope of the teachings.

The invention claimed is:
1. A crankshaft including:
a journal;
a first crankpin;
a second crankpin;
a first arm connecting the first crankpin to the journal;
a second arm connecting the second crankpin to the journal;

a first straight conduit extending from the first crankpin to the journal, emerging at a surface of the first crankpin at its median transverse plane and passing roughly to the center of the median plane of the first arm;

a second straight conduit extending from the second crankpin to the journal, emerging at a surface of the second crankpin at its median transverse plane and passing roughly to the center of the median plane of the second arm, wherein the crankshaft exhibits a geometry such that it cannot additionally include a diametric conduit in the median transverse plane of the journal fluidly joining the first conduit and second conduit; and a third straight conduit, non-diametric, disposed in the median transverse plane of the journal, fluidly connecting the first conduit and the second conduit.

2. The crankshaft according to claim 1, wherein the third conduit follows a non-diametric chord of the median transverse plane of the journal, the non-diametric chord emerging at the surface of the journal on both sides of a sector of the median transverse plane of the journal, exhibiting a sector angle from 90° up to, but not including, 180°.

3. The crankshaft according to claim 2, wherein the first and second conduits additionally emerge at the surface of journal at its median transverse plane.

4. An engine including:
a crankshaft, the crankshaft comprising:
a journal;
a first crankpin;
a second crankpin;
a first arm connecting the first crankpin to the journal;
a second arm connecting the second crankpin to the journal;
a first straight conduit extending from the first crankpin to the journal, emerging at a surface of the first crankpin at its median transverse plane and passing roughly to the center of the median plane of the first arm;
a second straight conduit extending from the second crankpin to the journal, emerging at a surface of the second crankpin at its median transverse plane and passing roughly to the center of the median plane of the second arm, wherein the crankshaft exhibits a geometry such that it cannot additionally include a diametric conduit in the median transverse plane of the journal fluidly joining the first conduit and second conduit; and
a third straight conduit, non-diametric, disposed in the median transverse plane of the journal, fluidly connecting the first conduit and the second conduit.

5. The engine according to claim 4, wherein the crankshaft includes zones of high stress that are determined at the surface of the first and second crankpins corresponding to crankpin zones upon which forces are exerted greater than a predefined threshold during engine operation, the first and second conduits emerging respectively at the surface of the first and second crankpins outside the high-stress zones.

6. A method for lubricating crankpins of a crankshaft including at least one journal, a first crankpin, and a second crankpin, a first arm connecting the first crankpin to the journal, and a second arm connecting the second crankpin to the journal, the crankshaft having a geometry such that it cannot simultaneously include:
a first straight conduit extending from the first crankpin to the journal and a second straight conduit extending from the second crankpin to the journal, the conduits emerging respectively at a surface of the first and second crankpins at their respective median transverse planes and passing respectively roughly to the center of the median plane of the first and second arms; and
a diametric bore in the median transverse plane of the journal, fluidly joining the first conduit and second conduit, the method comprising:
drilling a first straight conduit from the first crankpin to the journal and a second straight conduit from the second crankpin to the journal, such that the conduits emerge respectively at the surface of the first and second crankpins, at their respective median transverse planes and pass respectively roughly to the center of the median plane of the first and second arms; and
drilling a third straight conduit in the median transverse plane of the journal, connecting the first conduit and the second conduit.

7. The method according to claim 6, wherein the crankshaft comprises an internal-combustion engine crankshaft, the method further comprising determining zones of high stress at the surface of the first and second crankpins corresponding to zones of the crankpins upon which forces are exerted that are greater than a predefined threshold during engine operation, and wherein the first and second conduits emerge respectively at the surface of the first and second crankpins outside the high-stress zones.

\* \* \* \* \*